(12) United States Patent
Yee et al.

(10) Patent No.: US 9,541,377 B1
(45) Date of Patent: Jan. 10, 2017

(54) APPARATUS FOR REAL-TIME NON-CONTACT NON-DESTRUCTIVE THICKNESS MEASUREMENT USING TERAHERTZ WAVE

(71) Applicant: KOREA RESEARCH INSTITUTE OF STANDARDS AND SCIENCE, Daejeon (KR)

(72) Inventors: Dae-Su Yee, Daejeon (KR); Ji Sang Yahng, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 14/936,275

(22) Filed: Nov. 9, 2015

(30) Foreign Application Priority Data

Jun. 30, 2015 (KR) .......................... 10-2015-0093296

(51) Int. Cl.
*G01B 11/06* (2006.01)

(52) U.S. Cl.
CPC ...................................... *G01B 11/06* (2013.01)

(58) Field of Classification Search
CPC ....................................................... G01B 11/06
See application file for complete search history.

(56) References Cited

U.S. PATENT DOCUMENTS 8,476,592 B2 * 7/2013 Jeon .......................... H01S 5/40
250/339.06

FOREIGN PATENT DOCUMENTS

| KR | 1020110093547 A | 8/2011 |
| KR | 1020140031070 A | 3/2014 |
| KR | 101453472 B1 | 10/2014 |

OTHER PUBLICATIONS

Yee, D. et al., "High-Speed Broadband Frequency Sweep of Continuous-Wave Terahertz Radiation," Optics Express, vol. 23, No. 11, Jun. 1, 2015, Available Online May 28, 2015, 9 pages.

* cited by examiner

*Primary Examiner* — Mark R Gaworecki
(74) *Attorney, Agent, or Firm* — Alleman Hall McCoy Russell & Tuttle LLP

(57) ABSTRACT

Provided is an apparatus for real-time non-contact non-destructive thickness measurement using a terahertz wave, and more particularly, an apparatus for real-time non-contact non-destructive thickness measurement using a terahertz wave, which is capable of measuring a thickness of a sample by irradiating a terahertz continuous wave, which is generated from a wavelength-fixed laser and a wavelength-swept laser and of which the frequency is changed at a high speed, to the sample and measuring the terahertz wave transmitting or reflected from the sample.

16 Claims, 8 Drawing Sheets

APPARATUS FOR REAL-TIME NON-CONTACT NON-DESTRUCTIVE THICKNESS MEASUREMENT USING TERAHERTZ WAVE

CROSS-REFERENCE TO RELATED APPLICATIONS

This application claims priority under 35 U.S.C. §119 to Korean Patent Application No. 10-2015-0093296, filed on Jun. 30, 2015, in the Korean Intellectual Property Office, the disclosure of which is incorporated herein by reference in its entirety.

TECHNICAL FIELD

The following disclosure relates to an apparatus for thickness measurement using a terahertz wave, and more particularly, to an apparatus for real-time non-contact non-destructive thickness measurement using a terahertz wave, which is capable of measuring a thickness of a sample by irradiating a terahertz continuous wave, which is generated from a wavelength-fixed laser and a wavelength-swept laser and of which the frequency is changed at a high speed, to the sample and measuring the terahertz wave transmitting or reflected from the sample.

BACKGROUND

A terahertz wave band (0.1 THz to 10 THz) transmits a non-metallic material and a non-conductive material and has an electromagnetic wave of very low energy as much as several meV and therefore little affects a human body.

An example of the typical non-contact method for measuring a thickness of non-metallic material may include an optical method, which may not measure a thickness of material through which light is not transmitted. On the other hand, the terahertz wave may transmit the non-metallic material, and therefore a method for measuring a thickness of a non-metallic material through which light is not transmitted may use a terahertz wave.

Further, a resonance frequency of very various molecules is distributed in the terahertz wave band. In this case, these molecules are identified in real-time by a non-destructive, non-opened, non-contact method. As a result, it is expected that a new-conceptual analysis technology which does not exist now in medical treatment, medical science, agricultural food, environmental measurement, bio, advanced material evaluation, etc., may be implemented.

Therefore, researches to develop and use wave sources operated in a frequency band of 0.1 to 10 THz which is called a THz gap region have been conducted.

As the related art document disclosing a method for generating a terahertz continuous wave of which the frequency is changed at a high speed using a wavelength-fixed laser and a wavelength-swept laser, there is Korean Patent No. 10-1453472.

However, the method suggests only a technology of merely generating a terahertz wave but does not suggest a technology of measuring a thickness of a sample using the generated terahertz wave.

RELATED ART DOCUMENT

Patent Document

1. Korean Patent No. 10-1453472 (Published on Oct. 21, 2014)

SUMMARY

An embodiment of the present invention is directed to providing an apparatus for real-time non-contact non-destructive thickness measurement using a terahertz wave, which is capable of measuring a thickness of a sample by irradiating a terahertz continuous wave, which is generated from a wavelength-fixed laser and a wavelength-swept laser and of which the frequency is changed at a high speed, to the sample and measuring the terahertz wave transmitting or reflected from the sample.

Other objects of the present invention may be easily understood based on the following description of embodiments.

In one general aspect, an apparatus for real-time non-contact non-destructive thickness measurement using a terahertz wave includes: a wavelength-fixed laser generating first laser light having a first fixed wavelength λ1; a wavelength-swept laser generating second laser light having a second wavelength λ2 changed from a preset minimum wavelength to a preset maximum wavelength at a high speed for one period; a driver applying a voltage modulated at the same frequency as a wavelength sweep rate to the wavelength-swept laser to change the second wavelength from the minimum wavelength to the maximum wavelength for the one period; a coupler coupling the first laser light with the second laser light to form mixed light and splitting the mixed light into first mixed light and second mixed light; an emitter receiving the first mixed light split from the coupler to output the terahertz wave having a frequency $f_{THz}=|f_1-f_2|$ corresponding to a difference between a frequency $f_1=c/\lambda_1$ (c is the speed of light in vacuum) corresponding to the first wavelength $\lambda_1$ and a frequency $f_2=c/\lambda_2$ corresponding to the second wavelength $\lambda_2$; a sample irradiated with the terahertz wave output from the emitter; a detector receiving the second mixed light split from the coupler and the terahertz wave transmitting or reflected from a sample to generate a photocurrent; a data acquisition unit converting the photocurrent into digital data to acquire and output the digital data; and a calculator generating frequency-domain data from the output digital data, performing fast Fourier transform on the frequency-domain data to generate time-domain data, and calculating a thickness of the sample on the basis of the time-domain data.

The one period may be an inverse number of the wavelength sweep rate which is equal to or more than 100 Hz.

The calculator may use $$d = \frac{c}{2}(\Delta\tau_2 - 2\Delta\tau_3)$$

as Equation calculating the thickness of the sample, in case that the second mixed light and the terahertz wave transmitting the sample are input to the detector.

d: Thickness of the sample c: Speed of light in vacuum $\Delta\tau_1$: Difference between time taken to propagate the terahertz wave without transmitting the sample and time taken to propagate the terahertz wave by once transmitting the sample $\Delta\tau_2$: Time taken for the terahertz wave to once reciprocate in the sample The calculator may find out a time delay when the terahertz wave is propagated without transmitting the sample, in the time-domain data measured without transmitting the sample, and a time delay when the terahertz wave is propagated after once transmitting the sample, and a time delay when the terahertz wave is propagated by once transmitting the sample after the terahertz wave once reciprocates in the sample, in the time-domain data measured with transmitting the sample, in case that the second mixed light and the terahertz wave transmitting the sample are input to the detector to use the $\Delta\tau_1$ which is a value obtained by subtracting the time delay when the terahertz wave is propagated without transmitting the sample from the time delay when the terahertz wave is propagated after once transmitting the sample and the $\Delta\tau_2$ which is a value obtained by subtracting the time delay when the terahertz wave is propagated after once transmitting the sample from the delay time when the terahertz wave is propagated by once transmitting the sample after the terahertz wave once reciprocates in the sample.

The calculator may use $$d = \frac{c}{2n_g}\Delta\tau_2$$

as Equation calculating the thickness of the sample, in case that the second mixed light and the terahertz wave reflected from the sample are input to the detector.

d: Thickness of the sample
$n_g$: Group refractive index of the sample
c: Speed of light in vacuum
$\Delta\tau_2$: Time taken for the terahertz wave to once reciprocate in the sample The calculator may find out a time delay when the terahertz wave is reflected from a surface of the sample and a time delay when the terahertz wave is reflected from a surface opposite to the surface after once transmitting the sample in the time-domain data measured after the terahertz wave is reflected from the sample, in case that the second mixed light and the terahertz wave reflected from the sample are input to the detector to use the $\Delta\tau_2$ which is a value obtained by subtracting the time delay when the terahertz wave is reflected from the surface of the sample from the time delay when the terahertz wave is reflected from the surface opposite to the surface after once transmitting the sample.

The first wavelength of the first laser light generated by the wavelength-fixed laser may be fixed to 1545 nm, the minimum wavelength and the maximum wavelength of the second wavelength of the second laser light generated by the wavelength-swept laser may be each 1544 nm and 1558 nm, and the one period for which the second wavelength is changed from the minimum wavelength to the maximum wavelength may be 1 ms.

The apparatus may further include: a variable time delay tool disposed between the coupler and the detector to variably time-delay the second mixed light split from the coupler and input the variably time-delayed second mixed light to the detector.

The apparatus may further include: a variable time delay tool disposed between the coupler and the emitter to variably time-delay the first mixed light split from the coupler and input the variably time-delayed first mixed light to the emitter.

The apparatus may further include: an amplifier disposed between the detector and the data acquisition unit to amplify the photocurrent generated from the detector and transfer the amplified photocurrent to the data acquisition unit.

The data acquisition unit may convert the photocurrent into the digital data to acquire the digital data for the one period (inverse number of the wavelength sweep rate) while being triggered by a synchronous signal of the same frequency as the wavelength sweep rate provided from the driver.

The data acquisition unit may repeat the acquisition of the digital data for the one period by a preset number of averaged traces and provide the repeatedly acquired digital data traces to the calculator and the calculator may average the repeatedly acquired digital data traces to improve a signal to noise ratio.

The wavelength-fixed laser may be a DFB-LD.

The wavelength-swept laser or the wavelength-fixed laser may further include: an optical fiber amplifier disposed at an output terminal to amplify an optical power of the first laser light or the second laser light.

The apparatus may further include: an off-axis parabolic mirror or a lens disposed on a path of the terahertz wave from the emitter to the detector.

The apparatus may further include: a beam splitter disposed on a path of the terahertz wave from the emitter to the detector.

Other features and aspects will be apparent from the following detailed description, the drawings, and the claims.

DETAILED DESCRIPTION OF MAIN ELEMENTS

Figure 1:
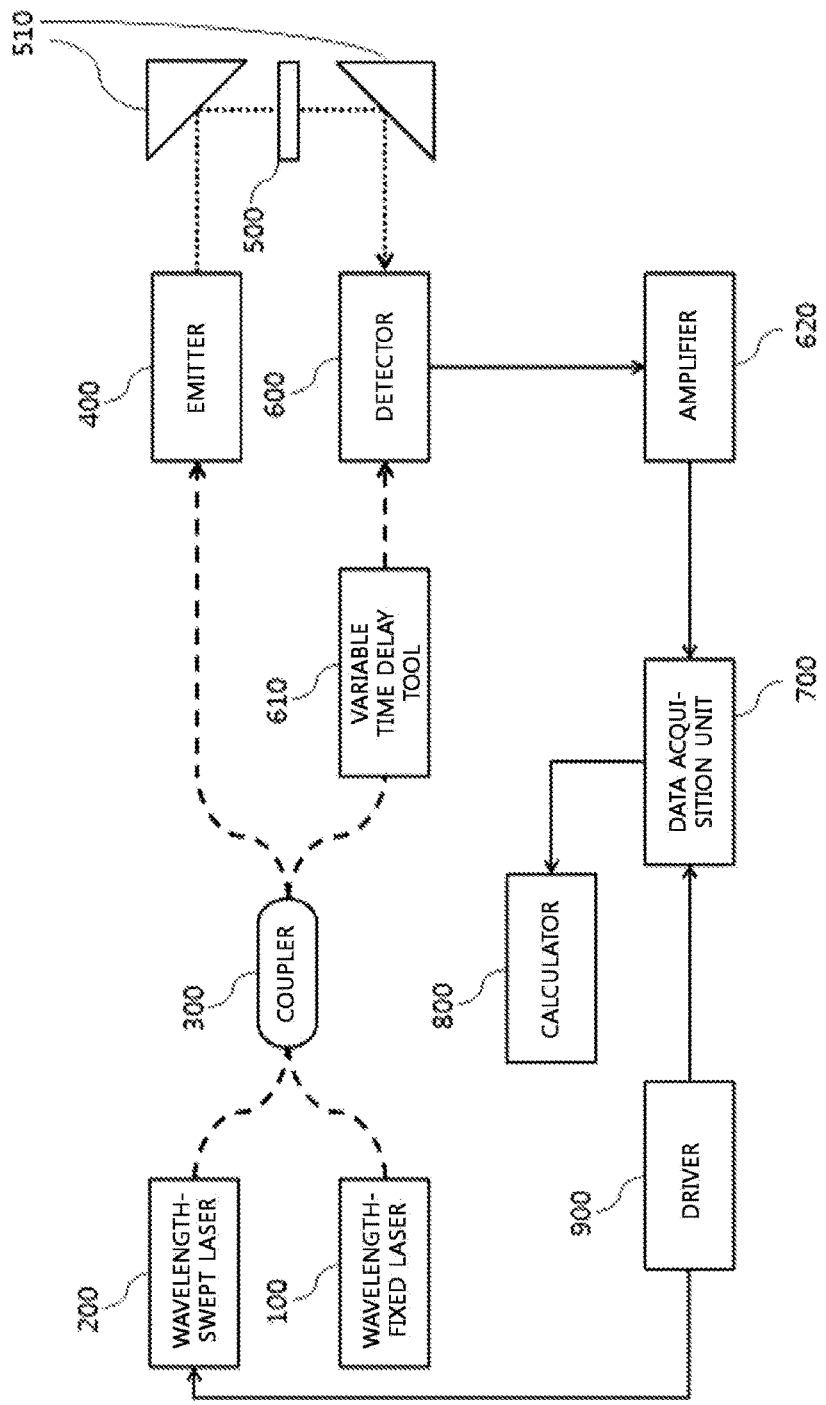
FIG. 1 is a block diagram of an apparatus for real-time non-contact non-destructive thickness measurement using a terahertz wave according to an exemplary embodiment of the present invention.

100: Wavelength-fixed laser
200: Wavelength-swept laser
300: Coupler
400: Emitter
500: Sample
510: Off-axis parabolic mirror
511: Lens
520: Beam splitter
600: Detector
610: Variable time delay tool
620: Amplifier
700: Data acquisition unit
710: Time delay when terahertz wave is propagated without transmitting sample
711: Terahertz wave propagated without transmitting sample
720: Time delay when terahertz wave is propagated after once transmitting sample
721: Terahertz wave propagated after once transmitting sample
730: Time delay when terahertz wave is propagated by once transmitting sample after once reciprocating in sample
731: Terahertz wave propagated by once transmitting sample after once reciprocating in sample
741: Terahertz wave reflected from surface of sample
751: Terahertz wave reflected from surface opposite to surface after once transmitting sample
800: Calculator
900: Driver

DETAILED DESCRIPTION OF EMBODIMENTS

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention.

Throughout the accompanying drawings, the same reference numerals will be used to describe the same components. Further, when it is determined that the detailed description of the known art related to the present invention may obscure the gist of the present invention, the detailed description thereof will be omitted.

Hereinafter, exemplary embodiments of the present invention will be described in detail with reference to the accompanying drawings.

In the case of using a terahertz pulse wave to measure a thickness, an expensive femtosecond laser needs to be used. In the case of using a terahertz continuous wave to measure a thickness, costs are reduced, but data need to be measured while changing a frequency of the terahertz continuous wave and therefore measurement time may be long. To overcome the above problem, as one of the two lasers used to generate the terahertz continuous wave, a wavelength-swept laser is used. That is, frequency-domain data are measured at a high speed while a frequency of the terahertz continuous wave is changed at a high speed, and thus a thickness may be measured by a real-time non-contact non-destructive manner based on signal processing and calculation.

FIG. 1 is a block diagram of an apparatus for real-time non-contact non-destructive thickness measurement using a terahertz wave according to an exemplary embodiment of the present invention. Referring to FIG. 1, an apparatus for real-time non-contact non-destructive thickness measurement using a terahertz wave according to an exemplary embodiment of the present invention may include a wavelength-fixed laser 100, a wavelength-swept laser 200, a coupler 300, an emitter 400, a sample 500, an off-axis parabolic mirror 510, a detector 600, a variable time delay tool 610, an amplifier 620, a data acquisition unit 700, a calculator 800, and a driver 900.

The wavelength-fixed laser 100 generates first laser light having a first fixed wavelength. The wavelength-fixed laser may be a distributed feedback laser diode (DFB-LD). To obtain the terahertz continuous wave of a wide band frequency, it is preferable to fix the first wavelength to be close to a threshold value (minimum value or maximum value) in a varying section of a second wavelength. In detail, when the varying section of the second wavelength ranges from 1544 nm to 1558 nm, the first wavelength may be 1545 nm.

The wavelength-swept laser 200 generates second laser light having the second wavelength changed at a high speed.

The driver 900 applies a voltage modulated at the same frequency as a wavelength sweep rate to the wavelength-swept laser to change the second wavelength from a preset minimum wavelength to a preset maximum wavelength based on an inverse number of the wavelength sweep rate as a period. When optical power of the wavelength-swept laser and the wavelength-fixed laser is small, optical fiber amplifiers may be disposed at each output terminal to amplify the optical power.

The coupler 300 may couple the first laser light with the second laser light to form mixed light and split the mixed light into first mixed light and second mixed light.

The emitter 400 may transform the first mixed light split from the coupler into the terahertz wave. When the emitter 400 is a photomixer, the emitter 400 may include a photoconductor and an antenna. The photoconductor transforms the mixed light into a photocurrent which may emit the terahertz wave through the antenna. The emitter 400 may use a beating phenomenon to generate the terahertz wave having a frequency $f_{THz}=|f_1-f_2|$ corresponding to a difference between a frequency $f_1=c/\lambda_1$ (c is the speed of light in vacuum) corresponding to the first wavelength $\lambda_1$ and a frequency $f_2=c/\lambda_2$ corresponding to the second wavelength $\lambda_2$. Therefore, the frequency of the terahertz wave generated by the first fixed wavelength and the second wavelength changed at a high speed may be changed at a high speed. A frequency sweep rate of the terahertz wave is equal to the wavelength sweep rate of the wavelength-swept laser 320 and may rely on a wavelength sweep period which is the inverse number of the wavelength sweep rate. The sweep rate may range from hundreds of Hz to several kHz. When a sweep period of the second wavelength is 1 ms, the sweep rate may be 1 kHz.

The sample 500 is an object of which the thickness is to be measured, and preferably, may be a non-metallic material and a non-conductive material.

The off-axis parabolic mirror 510 changes a direction of the terahertz wave generated from the emitter and may let the terahertz wave reach the detector through collimation and focusing. When there is no need to change an optical path of the terahertz wave, as illustrated in FIG. 5, a lens 511 may be used instead of the off-axis parabolic mirror 510.

The detector 600 is input with the second mixed light split from the coupler and the terahertz wave transmitting the sample and a photocarrier excited by the second mixed light in the detector 600 is biased by an electric field of the terahertz wave to generate a photocurrent. When the time delay is excessively increased due to a difference between lengths of the two optical paths from the coupler to the detector, coherence between the terahertz wave and the second mixed light may be reduced in the detector. Therefore, the time delay may be appropriately controlled by using the variable time delay tool 610 which may time-delay the first mixed light or the second mixed light to keep the coherence between the terahertz wave and the second mixed light in the detector 600.

Here, the apparatus for real-time non-contact non-destructive thickness measurement using a terahertz wave may include an amplifier 620 which amplifies the photocurrent output from the detector 600 and transfers the amplified photocurrent to the data acquisition unit 700.

The data acquisition unit 700 converts the photocurrent into the digital data to acquire the digital data for one period (inverse number of the wavelength sweep rate) while being triggered by a synchronous signal of the same frequency as the wavelength sweep rate provided from the driver 900. The data acquisition unit 700 provides the acquired data to the calculator 800. Further, the data acquisition unit 700 may repeatedly acquire the digital data for one period by a preset number of averaged traces and provide the repeatedly acquired digital data traces to the calculator 800 and the calculator 800 may average the repeatedly acquired digital data traces to improve a signal to noise ratio and use the resulting digital data to calculate a thickness of the sample.

Figure 2:
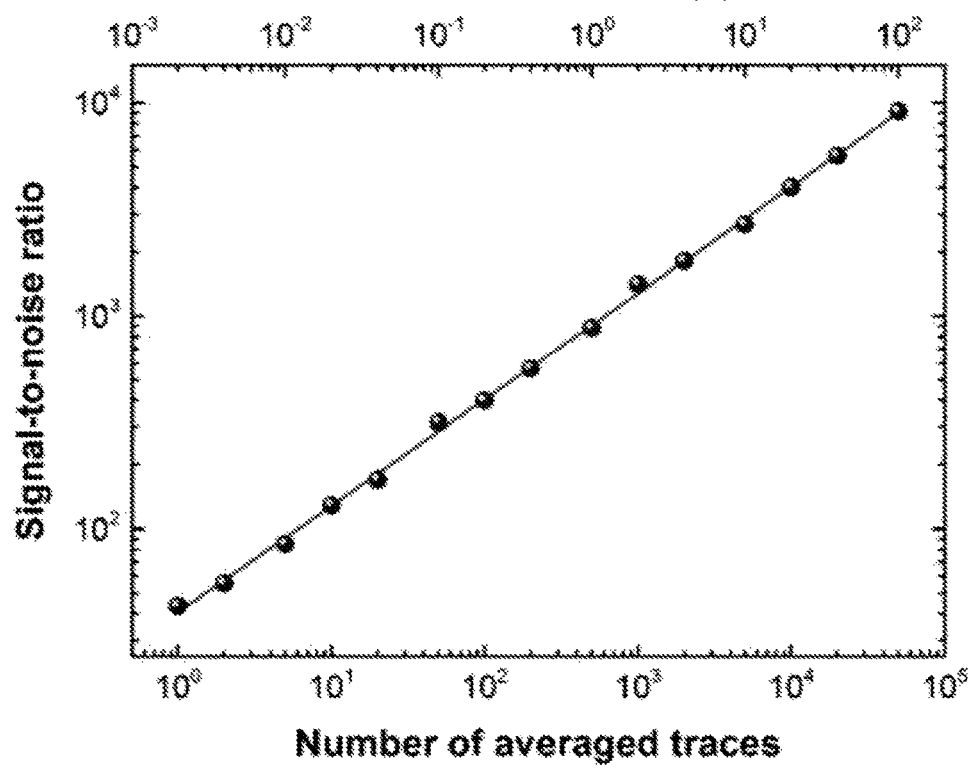
FIG. 2 is a graph illustrating the improvement result in signal to noise ratio by repeatedly measuring data by the apparatus for real-time non-contact non-destructive thickness measurement using a terahertz wave according to the exemplary embodiment of the present invention.

FIG. 2 is a graph illustrating the improvement result in signal to noise ratio by repeatedly measuring digital data by the apparatus for real-time non-contact non-destructive thickness measurement using a terahertz wave according to the exemplary embodiment of the present invention. That is, in the apparatus for real-time non-contact non-destructive thickness measurement using a terahertz wave according to an exemplary embodiment of the present invention, the signal to noise ratio is improved when the calculator 800 averages the digital data traces repeatedly acquired by the data acquisition unit 700. Referring to FIG. 2, when the number of averaged traces is increased, it may be appreciated that the signal to noise ratio of the resulting digital data is improved. However, a measurement time may be increased in proportion to the increasing number of averaged traces.

Referring back to FIG. 1, the calculator 800 may transform the digital data acquired by the data acquisition unit 700 into the frequency-domain data. For this purpose, the change in the second wavelength of the wavelength-swept laser 200 over time for one period needs to be measured in advance. The change $\lambda_2(t)$ in the second wavelength of the wavelength-swept laser over time for one period may be measured by a Fabry-Perot interferometer or a Mach-Zehnder interferometer. The change $f_{THz}(t)=|c/\lambda_1-c/\lambda_2(t)|$ in the frequency of the terahertz wave over time for one period may be found by the previously measured change in the second wavelength over time for one period. The calculator 800 may transform the digital data y(t) into the frequency-domain data y ($f_{THz}$) by using the change in the frequency of the terahertz wave over time for one period. Further, the calculator may perform the fast Fourier transform on the frequency-domain data to generate the time-domain data Y($\tau$) and calculate the thickness of the sample on the basis of the time-domain data.

Hereinafter, a principle of calculating the thickness using the time-domain data will be described.

Figure 3A:
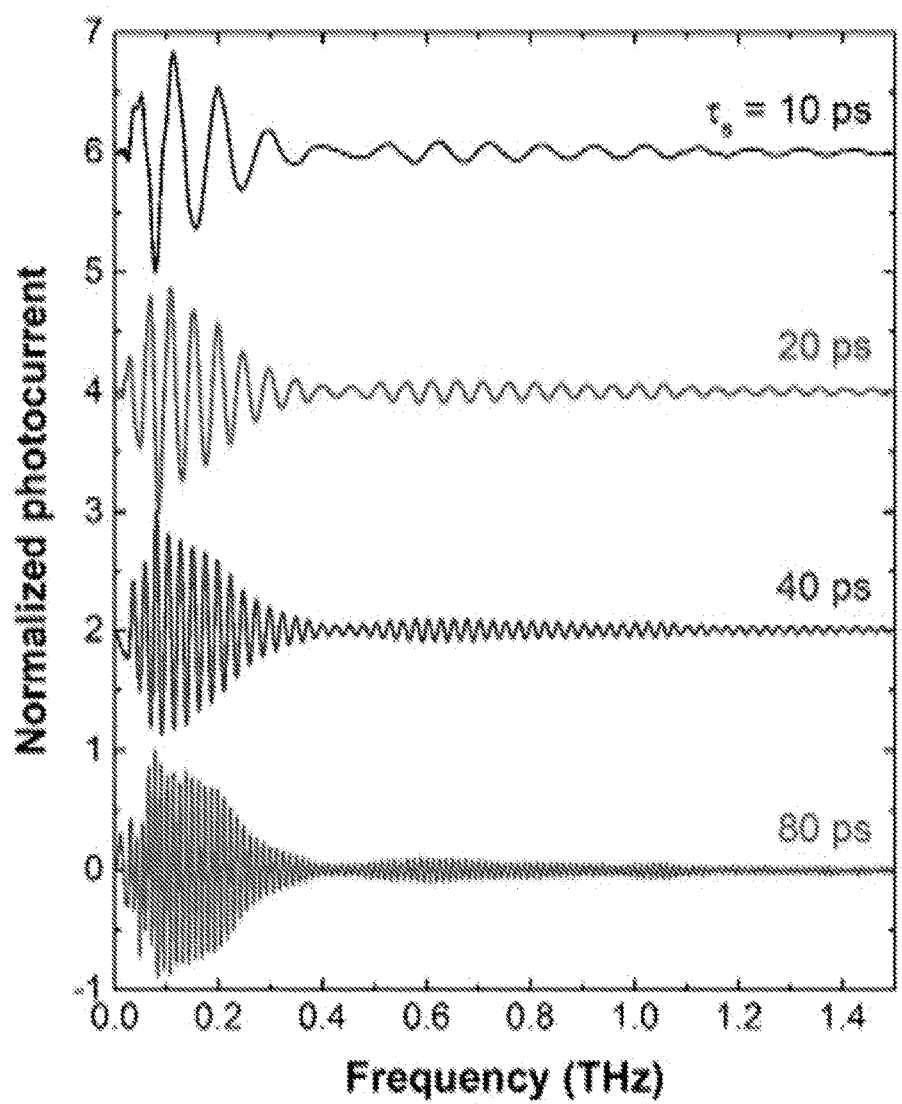
FIG. 3A is a graph illustrating frequency-domain data measured for various time delays by the apparatus for real-time non-contact non-destructive thickness measurement using a terahertz wave according to the exemplary embodiment of the present invention.
Figure 3B:
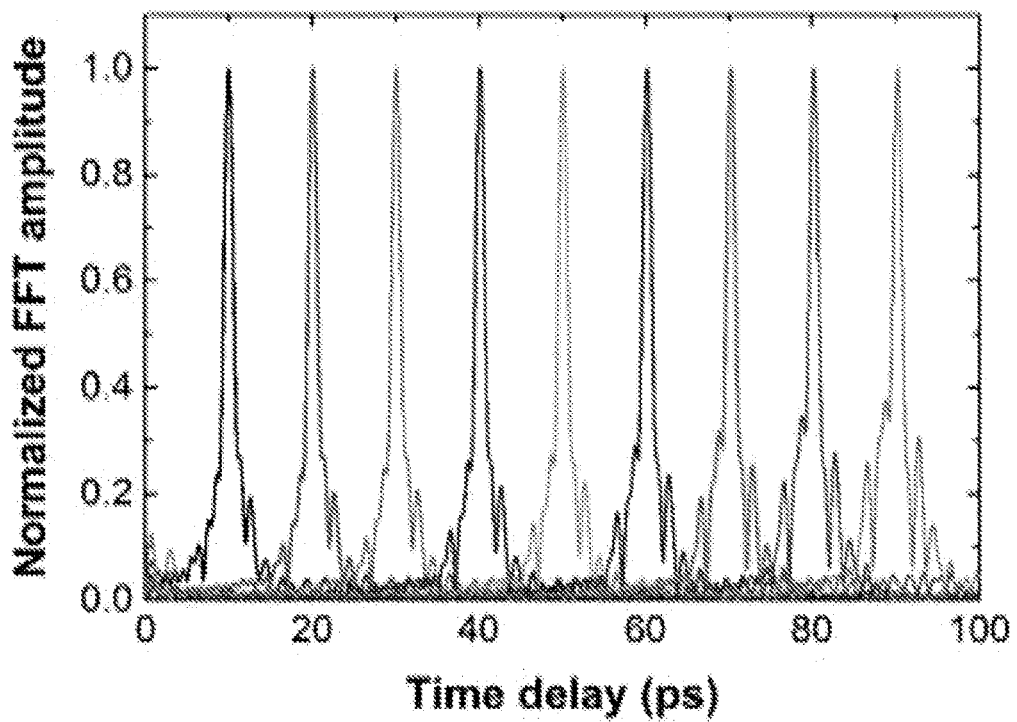
FIG. 3B is a graph illustrating time-domain data generated by performing fast Fourier transform on the frequency-domain data measured for various time delays by the apparatus for real-time non-contact non-destructive thickness measurement using a terahertz wave according to the exemplary embodiment of the present invention.

FIG. 3A is a graph illustrating the frequency-domain data measured for various time delays by the apparatus for real-time non-contact non-destructive thickness measurement using a terahertz wave according to the exemplary embodiment of the present invention and FIG. 3B is a graph illustrating the time-domain data measured for various time delays by the apparatus for real-time non-contact non-destructive thickness measurement using a terahertz wave according to the exemplary embodiment of the present invention. That is, in the apparatus for real-time non-contact non-destructive thickness measurement using a terahertz wave according to the exemplary embodiment of the present invention, when a terahertz wave reaches the detector 600 without transmitting the sample with time delays of 10 ps, 20 ps, 40 ps, and 80 ps set by the variable time delay tool 610, the graph (FIG. 3A) illustrates the frequency-domain data generated by allowing the calculator 800 to transform the digital data acquired by the data acquisition unit 700 and the graph (FIG. 3B) illustrates the time-domain data generated by performing the fast Fourier transform on the frequency-domain data. Unlike FIG. 3A illustrating the frequency-domain data measured by a transmission-type thickness measurement apparatus according to the exemplary embodiment of the present invention, it may be appreciated from FIG. 3B illustrating the time-domain data generated by performing the fast Fourier transform on the frequency-domain data that a peak is generated at a position of the delayed time and thus the delay time information may be easily extracted. The delay time occurs due to the difference between the lengths of the two optical paths from the coupler to the detector. The time delay may depend on the thickness of the sample when the sample is present in the path from the emitter 400 to the detector 600.

Figure 4A:
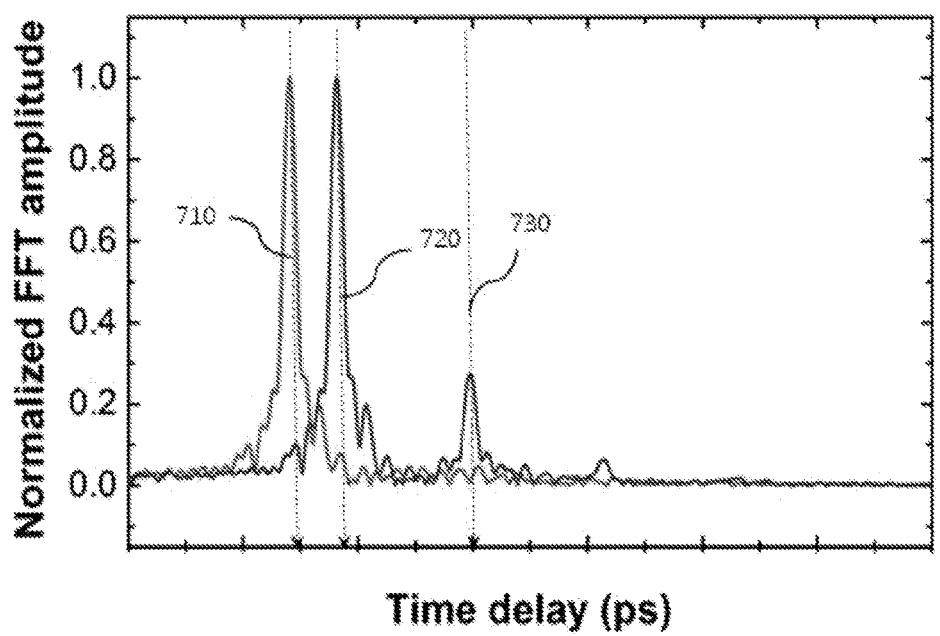
FIG. 4A is a graph illustrating the time-domain data measured by the apparatus for real-time non-contact non-destructive thickness measurement using a terahertz wave according to the exemplary embodiment of the present invention.
Figure 4B:
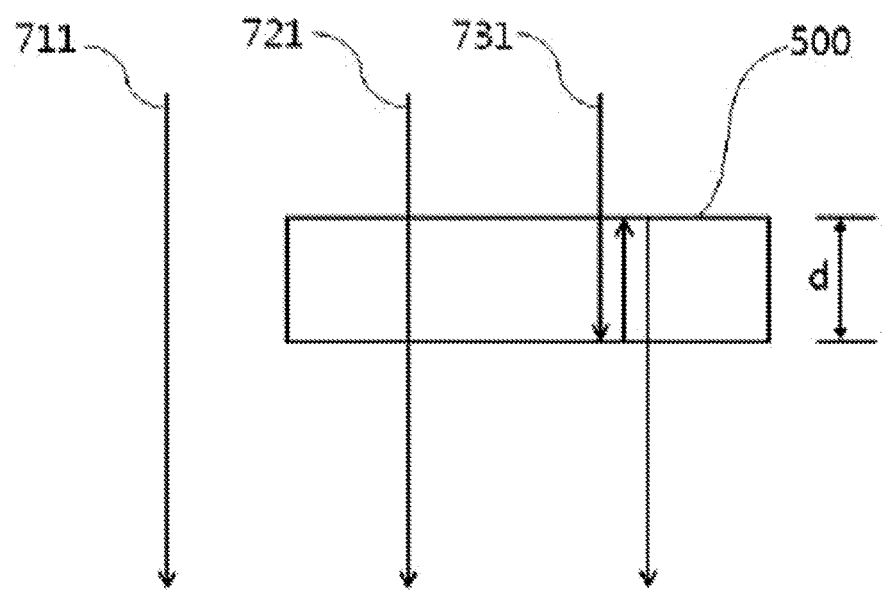
FIG. 4B is a diagram for describing a method for calculating a thickness of a sample by the apparatus for real-time non-contact non-destructive thickness measurement using a terahertz wave according to the exemplary embodiment of the present invention.

FIG. 4A is a graph illustrating the time-domain data measured by the apparatus for real-time non-contact non-destructive thickness measurement using a terahertz wave according to the exemplary embodiment of the present invention and FIG. 4B is a diagram for describing a method for calculating the thickness of the sample by the apparatus for real-time non-contact non-destructive thickness measurement using a terahertz wave according to the exemplary embodiment of the present invention.

Referring to FIG. 4A, in the apparatus for real-time non-contact non-destructive thickness measurement using a terahertz wave according to the exemplary embodiment of the present invention, when the sample 500 is not present in the path from the emitter 400 to the detector 600, the time-domain data generated by the calculator 800 is indicated. Referring to FIG. 4B, this condition may be a condition in which a terahertz wave 711 propagated without transmitting the sample reaches the detector 600. Referring back to FIG. 4A, in the apparatus for real-time non-contact non-destructive thickness measurement using a terahertz wave according to the exemplary embodiment of the present invention, when the sample 500 is disposed in the path from the emitter 400 to the detector 600, the time-domain data generated by the calculator 800 is indicated. This condition may include the condition that in FIG. 4B, a terahertz wave 721 propagated after once transmitting the sample and a terahertz wave 731 propagated by once transmitting the sample after once reciprocating in the sample reach the detector 600 at a time difference. Referring to FIG. 4A, information on a time delay 710 when the terahertz wave is propagated without transmitting the sample, a time delay 720 when the terahertz wave is propagated after once transmitting the sample, and a time delay 730 when the terahertz wave is propagated by once transmitting the sample after once reciprocating in the sample may be obtained from the time-domain data illustrated by the graph. That is, when in the graph, amplitude of the time-domain data is set to be a y axis and time is set to be an x axis, each time delay 710, 720, or 730 may be obtained from an x coordinate of a point at which the amplitude has a local maximum.

A method for calculating the thickness of the sample from the time-domain data measured by using the apparatus for real-time non-contact non-destructive thickness measurement using a terahertz wave according to the exemplary embodiment of the present invention includes obtaining the time delay 710 when the terahertz wave is propagated without transmitting the sample, the time delay 720 when the terahertz wave is propagated after once transmitting the sample, and the time delay 730 when the terahertz wave is propagated by once transmitting the sample after once reciprocating in the sample from the time-domain data and obtaining the thickness of the sample from the time delays 710, 720, and 730.

First, the finding out of the time delays from the time-domain data will be described. First, the time-domain data are obtained without disposing the sample 500 in the path from the emitter 400 to the detector 600 and then local maxima are investigated to find out the local maximum having the largest value, and the time delay 710 when the terahertz wave is propagated without transmitting the sample is determined. Further, the sample 500 is disposed in the path from the emitter 400 to the detector 600, the time-domain data are obtained, local maxima are investigated to find out the local maximum having the largest value among the local maxima, the time delay 720 when the terahertz wave is propagated after once transmitting the sample is determined, the local maximum having the second largest value among the local maxima is found, and the time delay 730 when the terahertz wave is propagated by once transmitting the sample after once reciprocating in the sample is determined.

Next, the obtaining of the thickness of the sample from the found times delays will be described. When $\Delta\tau_1$ is the difference between the time taken to propagate the terahertz wave without transmitting the sample and the time taken to propagate the terahertz wave by once transmitting the sample and $\Delta\tau_2$ is the time taken for the terahertz wave to once reciprocate in the sample, $\Delta\tau_1$ is a value obtained by subtracting the time delay 710 when the terahertz wave is propagated without transmitting the sample from the time delay 720 when the terahertz wave is propagated after once transmitting the sample and $\Delta_{T2}$ is a value obtained by subtracting the time delay 720 when the terahertz wave is propagated after once transmitting the sample from the time delay 730 when the terahertz wave is propagated by once transmitting the sample after once reciprocating in the sample.

Referring to FIG. 4B, $\Delta\tau_1$ and $\Delta\tau_2$ may be each represented by the following Equations 1 and 2.

$$\Delta\tau_3 = \frac{(n_g - 1)d}{c} \qquad \text{[Equation 1]}$$

$$\Delta\tau_2 = \frac{2n_g d}{c} \qquad \text{[Equation 2]}$$

In the above Equations 1 and 2, d is the thickness of the sample, c is the speed of light in vacuum, and $n_g$ is a group refractive index of the sample. From the above Equations 1 and 2, the thickness d of the sample may be represented by the following Equation 3.

$$d = \frac{c}{2}(\Delta\tau_2 - 2\Delta\tau_1) \qquad \text{[Equation 3]}$$

Therefore, the thickness of the sample may be obtained by the above Equation 3 and $\Delta\tau_1$ and $\Delta\tau_2$.

As described above, the thickness may be measured in the transmission mode where a terahertz wave transmits a sample, by using the apparatus for real-time non-contact non-destructive thickness measurement using a terahertz wave according to the exemplary embodiment of the present invention.

Next, a reflection-type apparatus for real-time non-contact non-destructive thickness measurement using a terahertz wave according to another exemplary embodiment of the present invention will be described.

Figure 5A:
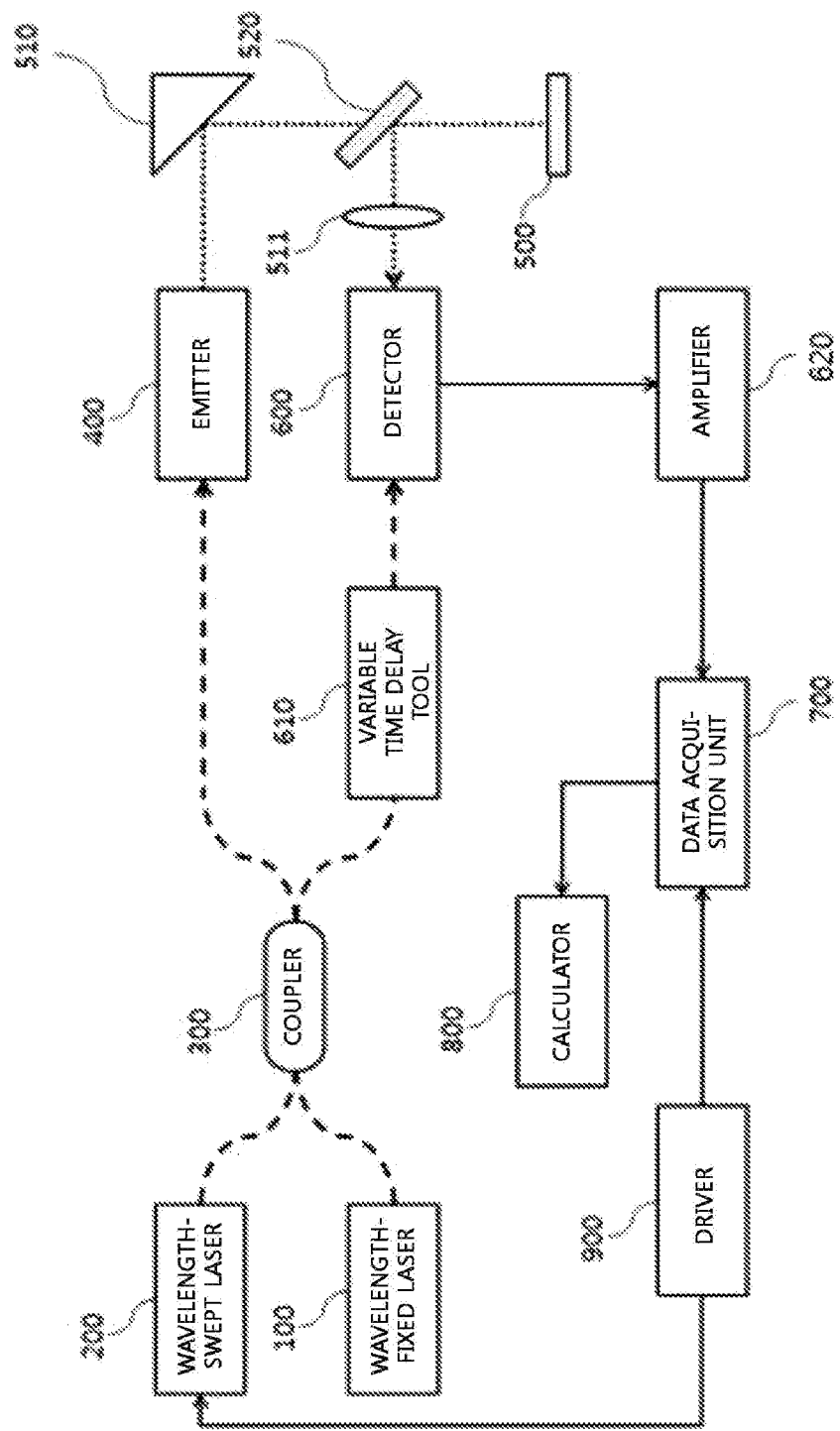
FIG. 5A is a block diagram of an apparatus for real-time non-contact non-destructive thickness measurement using a terahertz wave according to another exemplary embodiments of the present invention.

In describing FIG. 5A, the same components as FIG. 1 have the same configuration and operation principle and therefore the description thereof will be omitted. Referring to FIG. 5A, the terahertz wave emitted from the emitter 400 transmits the beam splitter 520 to be reflected from the sample 500 and then is again reflected from the beam splitter 520 to be input to the detector 600.

In this case, the lens 511 may be added between the beam splitter 520 and the detector 600, which may serve to focus the terahertz wave on the detector 600 similar to the off-axis parabolic mirror 510.

Figure 5B:
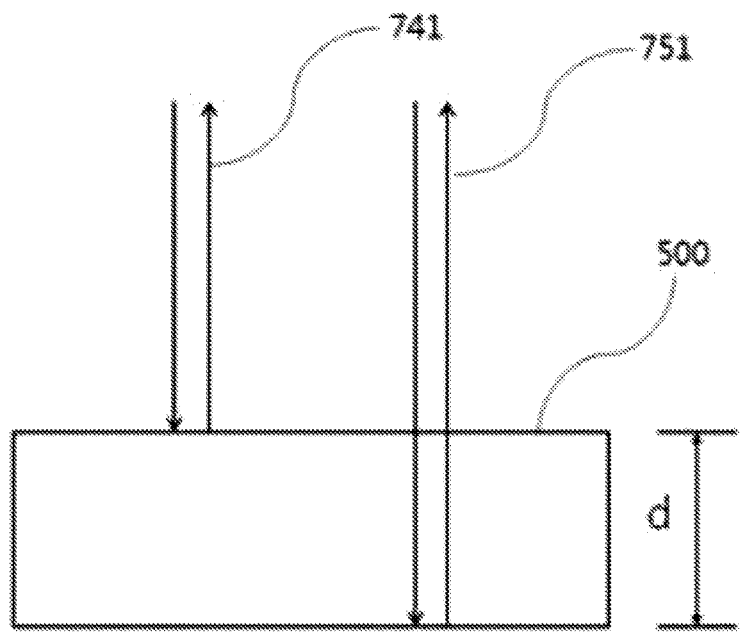
FIG. 5B is a diagram for describing a method for calculating a thickness of a sample by the apparatus for real-time non-contact non-destructive thickness measurement using a terahertz wave according to another exemplary embodiment of the present invention.

Even in an apparatus for real-time non-contact non-destructive thickness measurement using a terahertz wave according to another exemplary embodiment of the present invention of FIG. 5A, the calculator 800 may generate the time-domain data by the same method as described above. Only the difference is that the terahertz wave input to the detector may include the terahertz wave reflected from the surface of the sample and the terahertz wave reflected from the surface opposite to the surface by once transmitting the sample as illustrated in FIG. 5B. The method for calculating the thickness of the sample from the time-domain data measured by using the apparatus for real-time non-contact non-destructive thickness measurement using a terahertz wave according to another exemplary embodiment of the present invention includes obtaining a time delay 741 when the terahertz wave is reflected from the surface of the sample and a time delay 751 when the terahertz wave is reflected from the surface opposite to the surface after once transmitting the sample from the generated time-domain data and obtaining the thickness of the sample from the time delays.

First, the finding out of the time delays from the time-domain data will be described. Time-domain data are obtained by the calculator 800 of the apparatus for real-time non-contact non-destructive thickness measurement using a terahertz wave according to another exemplary embodiment of the present invention as illustrated in FIG. 5. In the obtained time-domain data, local maxima are investigated to find out the local maximum having the largest value among the local maxima, the time delay 741 when the terahertz wave is reflected from the surface of the sample is determined, the local maximum having the second largest value among the local maxima is found, and the time delay 751 when the terahertz wave is reflected from the surface opposite to the surface after once transmitting the sample is determined.

Next, the obtaining of the thickness of the sample from the found time delays will be described. When $\Delta\tau_2$ is the time taken for the terahertz wave to once reciprocate in the sample, $\Delta\tau_2$ is a value obtained by subtracting the time delay when the terahertz wave is reflected from the surface of the sample from the time delay when the terahertz wave is reflected from the surface opposite to the surface after once transmitting the sample.

$\Delta\tau_2$ may be represented by the above Equation 2, and therefore the thickness of the sample may be represented by the following Equation 4.

$$d = \frac{c}{2_g}\Delta\tau_2 \qquad \text{[Equation 4]}$$

Therefore, when the group refractive index of the sample is known in advance, the thickness of the sample may be obtained by the $\Delta\tau_2$ found by the apparatus for real-time non-contact non-destructive thickness measurement using a terahertz wave according to another exemplary embodiment of the present invention.

It may be appreciated from the foregoing description that the thickness of the sample may be measured by using a reflection-type thickness measurement apparatus.

As described above, according to the exemplary embodiments of the present invention, it is possible to provide the apparatus for real-time non-contact non-destructive thickness measurement using a terahertz wave, which is capable of measuring a thickness of a sample by irradiating a terahertz continuous wave, which is generated from a wavelength-fixed laser and a wavelength-swept laser and of which the frequency is changed at a high speed, to the sample and measuring the terahertz wave transmitting or reflected from the sample.

The apparatus for real-time non-contact non-destructive thickness measurement using a terahertz wave according to the exemplary embodiments of the present invention may measure the thickness of the non-conductive material in the transmission mode or the reflection mode, and preferably, may be expected to be usefully used to measure the thickness of the paint coat on the metal substrate made of an iron material, etc.

The foregoing description relates to the embodiments of the present invention, but the claims of the present invention are not limited to specific embodiments illustrated and described in the present specification but various modified embodiments which may be practiced by those skilled in the art without departing from the subject described in the appending claims may be construed to be included in the scope of the present invention.

What is claimed is:

1. An apparatus for real-time non-contact non-destructive thickness measurement using a terahertz wave, comprising:
    a wavelength-fixed laser generating first laser light having a first fixed wavelength $\lambda_1$;
    a wavelength-swept laser generating second laser light having a second wavelength $\lambda_2$ changed from a preset minimum wavelength to a preset maximum wavelength at a high speed for one period;
    a driver applying a voltage modulated at the same frequency as a wavelength sweep rate to the wavelength-swept laser to change the second wavelength from the minimum wavelength to the maximum wavelength for the one period;
    a coupler coupling the first laser light with the second laser light to form mixed light and splitting the mixed light into first mixed light and second mixed light;
    an emitter receiving the first mixed light split from the coupler to output a terahertz wave having a frequency $f_{THz}=|f_1-f_2|$ corresponding to a difference between a frequency $f_1=c/\lambda_1$ (c is the speed of light in vacuum) corresponding to the first wavelength $\lambda_1$ and a frequency $f_2=c/\lambda_2$ corresponding to the second wavelength $\lambda_2$;
    a sample irradiated with the terahertz wave output from the emitter;
    a detector receiving the second mixed light split from the coupler and the terahertz wave transmitting or reflected from a sample to generate a photocurrent;
    a data acquisition unit converting the photocurrent into digital data to acquire and output the digital data; and
    a calculator generating frequency-domain data from the output digital data, performing fast Fourier transform on the frequency-domain data to generate time-domain data, and calculating a thickness of the sample on the basis of the time-domain data.

2. The apparatus of claim 1, wherein the one period is an inverse number of the wavelength sweep rate which is equal to or more than 100 Hz.

3. The apparatus of claim 1, wherein the calculator uses $$d = \frac{c}{2}(\Delta\tau_2 - 2\Delta\tau_1)$$

as Equation calculating the thickness of the sample, in case that the second mixed light and the terahertz wave transmitting the sample are input to the detector, wherein
    d: Thickness of the sample,
    c: Speed of light in vacuum,
    $\Delta\tau_1$: Difference between time taken to propagate the terahertz wave without transmitting the sample and time taken to propagate the terahertz wave by once transmitting the sample, and
    $\Delta\tau_3$: Time taken for the terahertz wave to once reciprocate in the sample.

4. The apparatus of claim 3, wherein the calculator finds out a time delay when the terahertz wave is propagated without transmitting the sample, in the time-domain data measured without transmitting the sample, and a time delay when the terahertz wave is propagated after once transmitting the sample and a time delay when the terahertz wave is propagated by once transmitting the sample after the terahertz wave once reciprocates in the sample, in the time-domain data measured with transmitting the sample, in case that the second mixed light and the terahertz wave transmitting the sample are input to the detector to use the $\Delta\tau_1$ which is a value obtained by subtracting the time delay when the terahertz wave is propagated without transmitting the sample from the time delay when the terahertz wave is propagated after once transmitting the sample and the $\Delta\tau_2$ which is a value obtained by subtracting the time delay when the terahertz wave is propagated after once transmitting the sample from the delay time when the terahertz wave is propagated by once transmitting the sample after the terahertz wave once reciprocates in the sample.

5. The apparatus of claim 1, wherein the calculator uses $$d = \frac{c}{2n_g}\Delta\tau_2$$

as Equation calculating the thickness of the sample, in case that the second mixed light and the terahertz wave reflected from the sample are input to the detector, wherein d: Thickness of the sample, $n_g$: Group refractive index of the sample, c: Speed of light in vacuum, and $\Delta\tau_2$: Time taken for the terahertz wave to once reciprocate in the sample.

6. The apparatus of claim 5, wherein the calculator finds out a time delay when the terahertz wave is reflected from a surface of the sample and a time delay when the terahertz wave is reflected from a surface opposite to the surface after once transmitting the sample in the time-domain data measured after the terahertz wave is reflected from the sample, in case that the second mixed light and the terahertz wave reflected from the sample are input to the detector to use the $\Delta\tau_2$ which is a value obtained by subtracting the time delay when the terahertz wave is reflected from the surface of the sample from the time delay when the terahertz wave is reflected from the surface opposite to the surface after once transmitting the sample.

7. The apparatus of claim 1, wherein the first wavelength of the first laser light generated by the wavelength-fixed laser is fixed to 1545 nm, the minimum wavelength and the maximum wavelength of the second wavelength of the second laser light generated by the wavelength-swept laser are each 1544 nm and 1558 nm, and the one period for which the second wavelength is changed from the minimum wavelength to the maximum wavelength is 1 ms.

8. The apparatus of claim 1, further comprising:
a variable time delay tool disposed between the coupler and the detector to variably time-delay the second mixed light split from the coupler and input the variably time-delayed second mixed light to the detector.

9. The apparatus of claim 1, further comprising:
a variable time delay tool disposed between the coupler and the emitter to variably time-delay the first mixed light split from the coupler and input the variably time-delayed first mixed light to the emitter.

10. The apparatus of claim 1, further comprising:
an amplifier disposed between the detector and the data acquisition unit to amplify the photocurrent generated from the detector and transfer the amplified photocurrent to the data acquisition unit.

11. The apparatus of claim 1, wherein the data acquisition unit converts the photocurrent into the digital data to acquire the digital data for the one period (inverse number of the wavelength sweep rate) while being triggered by a synchronous signal of the same frequency as the wavelength sweep rate provided from the driver.

12. The apparatus of claim 1, wherein the data acquisition unit repeats the acquisition of the digital data for the one period by a preset number of averaged traces and provides the repeatedly acquired digital data traces to the calculator and the calculator averages the repeatedly acquired digital data traces to improve a signal to noise ratio.

13. The apparatus of claim 1, wherein the wavelength-fixed laser is a DFB-LD.

14. The apparatus of claim 1, wherein the wavelength-swept laser or the wavelength-fixed laser further includes an optical fiber amplifier disposed at an output terminal to amplify an optical power of the first laser light or the second laser light.

15. The apparatus of claim 1, further comprising:
an off-axis parabolic mirror or a lens disposed on a path of the terahertz wave from the emitter to the detector.

16. The apparatus of claim 1, further comprising:
a beam splitter disposed on a path of the terahertz wave from the emitter to the detector.

* * * * *

UNITED STATES PATENT AND TRADEMARK OFFICE
CERTIFICATE OF CORRECTION

PATENT NO. : 9,541,377 B1  Page 1 of 1
APPLICATION NO. : 14/936275
DATED : January 10, 2017
INVENTOR(S) : Dae-Su Yee and Ji Sang Yahng It is certified that error appears in the above-identified patent and that said Letters Patent is hereby corrected as shown below:

In the Claims

Column 12, Line 48, Claim 3, replace "$\Delta\tau_3$" with "$\Delta\tau_2$".

Signed and Sealed this
Twenty-eighth Day of February, 2017

Michelle K. Lee
*Director of the United States Patent and Trademark Office*